Feb. 26, 1952  H. W. HUBERS, JR  2,587,322
METHOD OF AND APPARATUS FOR CONTROLLED
HEATING OF ENCLOSURES
Filed Sept. 28, 1949  4 Sheets-Sheet 1
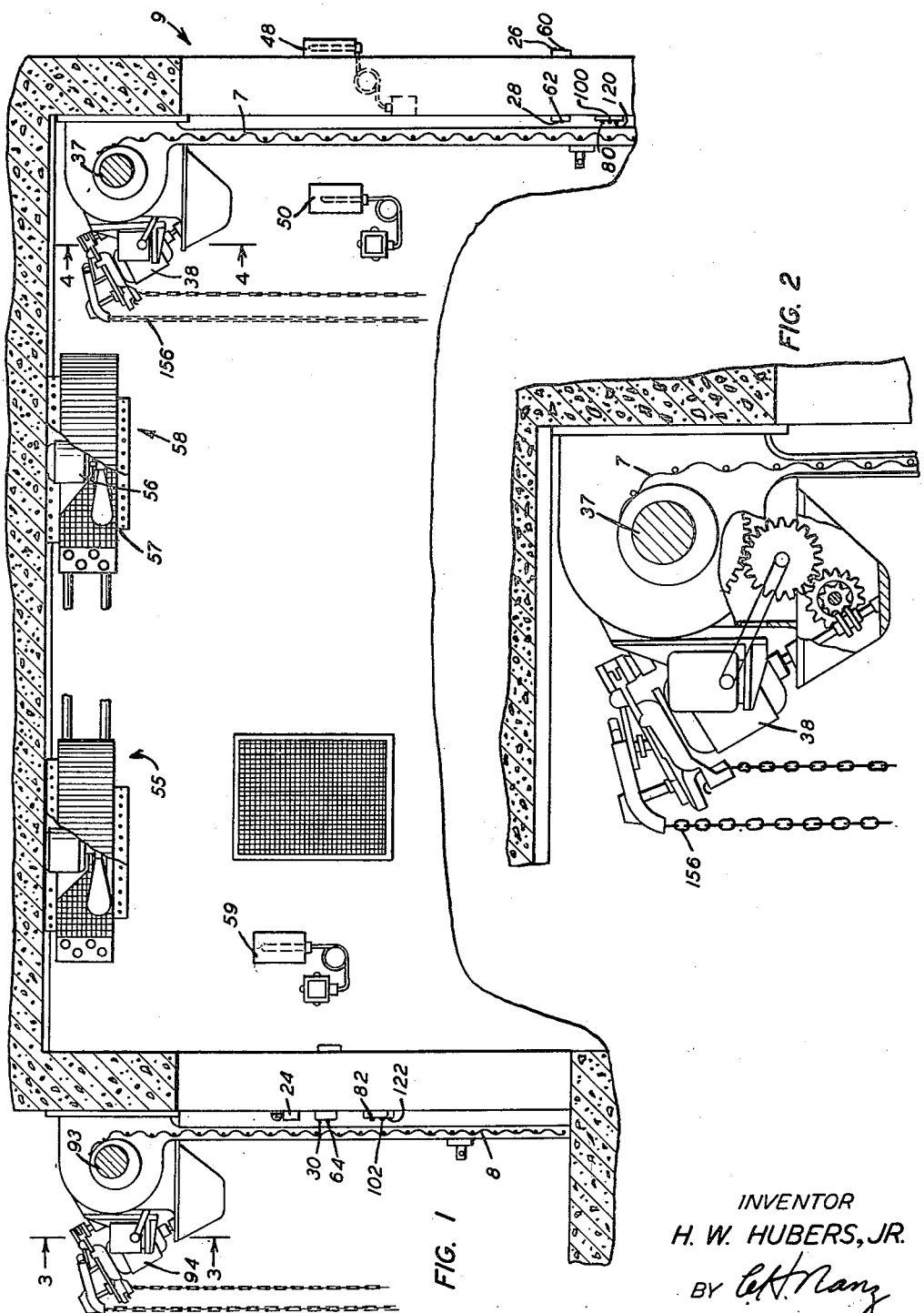
INVENTOR
H. W. HUBERS, JR.
BY
ATTORNEY Feb. 26, 1952   H. W. HUBERS, JR   2,587,322
METHOD OF AND APPARATUS FOR CONTROLLED
HEATING OF ENCLOSURES
Filed Sept. 28, 1949   4 Sheets-Sheet 2

INVENTOR
H. W. HUBERS, JR.
BY
ATTORNEY

Feb. 26, 1952    H. W. HUBERS, JR    2,587,322
METHOD OF AND APPARATUS FOR CONTROLLED
HEATING OF ENCLOSURES
Filed Sept. 28, 1949    4 Sheets-Sheet 3

INVENTOR
H.W. HUBERS, JR
BY
ATTORNEY

Patented Feb. 26, 1952

2,587,322

UNITED STATES PATENT OFFICE 2,587,322

METHOD OF AND APPARATUS FOR CONTROLLED HEATING OF ENCLOSURES

Herman W. Hubers, Jr., Essex, Md., assignor to Western Electric Company, Incorporated, New York, N. Y., a corporation of New York Application September 28, 1949, Serial No. 118,318

6 Claims. (Cl. 237—2)

This invention relates to methods and apparatus for controlled heating of enclosures, and more particularly to methods of and apparatus for controlled heating of enclosures having openings therein.

Shipping operations to and from buildings, such as, for example, factories and warehouses, often require having the outside doors open for substantial periods of time in weather sufficiently cold that heating systems known heretofore have been incapable of maintaining the interiors of the buildings at temperatures that were uniform, healthful and comfortable to persons working therein.

An object of this invention is to provide new and improved methods of and apparatus for controlled heating of enclosures.

A further object of this invention is to provide new and improved methods of and apparatus for controlled heating of enclosures having openings therein.

Another object of this invention is to provide new and improved methods of and apparatus for minimizing the effects of open exterior doors of buildings upon the temperature of the buildings during cold weather.

A method illustrating certain features of the invention may include blowing a sheet of warm air across a doorway when the doorway is open.

An apparatus illustrating certain features of the invention may include an enclosure having a doorway, a door movable between open and closed positions, means for heating the portion of the enclosure immediately adjacent to the doorway, and means responsive to the position of the door and the temperature outside the doorway for actuating the enclosure-heating means when the door is in an open position and the temperature outside the doorway is below a predetermined temperature.

A complete understanding of the invention may be obtained from the following detailed description of a method and an apparatus forming specific embodiments thereof, when read in conjunction with the appended drawings, in which:

Fig. 1 is a fragmentary, vertical section of an apparatus for practicing a method forming an embodiment of the invention;

Fig. 2 is an enlarged, fragmentary, vertical section of a portion of the apparatus shown in Fig. 1;

Figure 3:
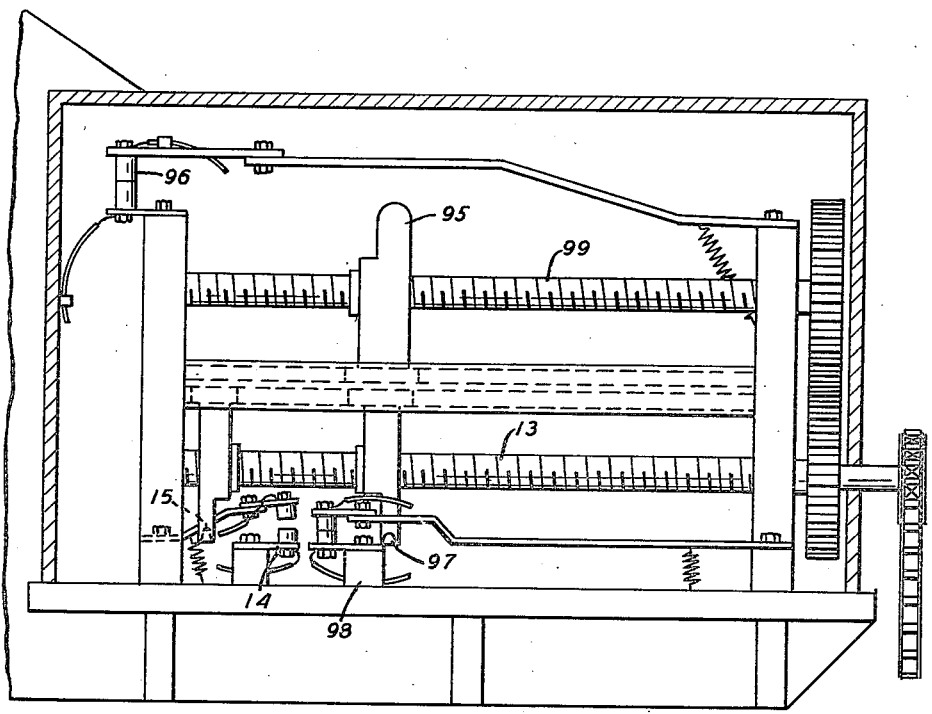
Fig. 3 is an enlarged, fragmentary, vertical section taken along line 3—3 of Fig. 1.

Referring now in detail to the drawings, there is shown therein an interlocking system for controlling the temperature inside an auto court 9 including an exterior door 7 and interior door 8 so that the exterior door cannot be opened if the interior door is open. The system includes a manually operable, momentary switch 10 (Fig. 5) positioned between a grounded conductor 11 and a conductor of a three-phase power line 13 for energizing a holding relay winding 12, a normally closed limit switch 14 closed when the interior door is moved from its closed position and opened by a lug 15 movable by a distributor screw 13 (Fig. 3) driven in synchronization with the interior door when the interior door is closed. If the interior door is open, the limit switch 14 (Fig. 6) is closed and a winding 16 of a relay 17 is energized to close contacts 18. The relay winding 12 is energized when the contacts 18 and the switch 10 is closed, and closes holding contacts 20 to light a lamp 22 indicating to an attendant inside the building that someone is at the exterior door and wishes the attendant to close the interior door. A bell 24 (Fig. 5) is energized only while the switch 10 is held closed.

If the interior door 8 (Fig. 1) is closed so that the switch 14 is open, to open the exterior door 7, one of three sets of manually operable interlocked switch contacts 26 and 27, 28 and 29, and 30 and 31, located outside the exterior door, inside the exterior door and inside the interior door, respectively, may be actuated to open one of the contacts 26, 28 and 30 and close the corresponding one of the contacts 27, 29 and 31 to energize a holding relay winding 32 of a relay 33 which closes holding contacts 34 and contacts 36—36 to energize a motor 38 to drive a shaft 37 in a direction to open the exterior door. As the exterior door arrives at its open position a limit switch 40 is opened by a lug 39 movable by a screw 41 driven in synchronization with the movement of the door 7 to stop the motor 38, and a limit switch 42 was closed as the door 7 moved away from its closed position and a lug 43 moved out of engagement with the switch 42 to permit subsequent closing of the door.

Closing of the switch 42 causes energization of a relay winding 44 of a relay 45 to close switch contacts 46 in series with an outside thermostatic switch 48 and in parallel with an inside thermostatic switch 50. The thermostatic switch 50 is closed if the temperature at its location is below room temperature, and the thermostatic switch 48 is closed when the temperature outside the exterior door 7 is below 50° F. When either of these thermostats is closed and a manually operable contactor 47 is in engagement with a contact 49 in series with the thermostatic switches 48 and 50, a relay winding 52 of a relay 53 is energized to close contacts 54—54 to a heater fan motor 56. The motor 56 drives a fan 57 (Fig. 1) of a heater 58 to blow a curtain of warm air across the exterior door opening thereby preventing undue cooling of the motor court. Operation of a heater 55 is controlled by an inside thermostatic switch 59. The contactor 47 also may be set selectively in engagement with a dummy contact 61 and a contact 63 in parallel with the switches 48 and 50 and the contacts 46 of the relay 45. The heaters 55 and 58 are steam heated, and hot air is blown therethrough.

Figure 4:
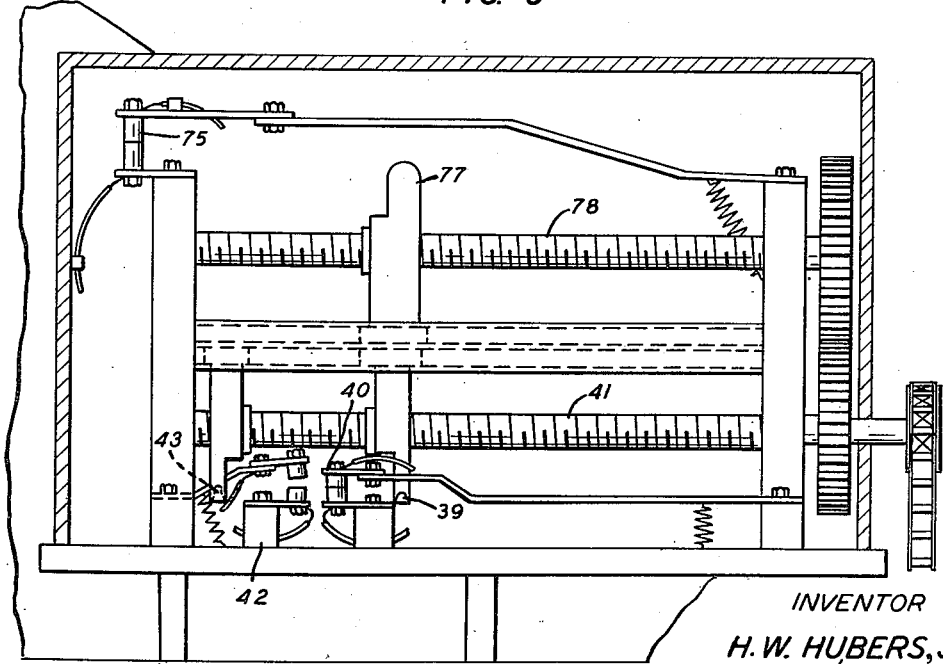
Fig. 4 is an enlarged, fragmentary, vertical section taken along line 4—4 of Fig. 1.
Figure 5:
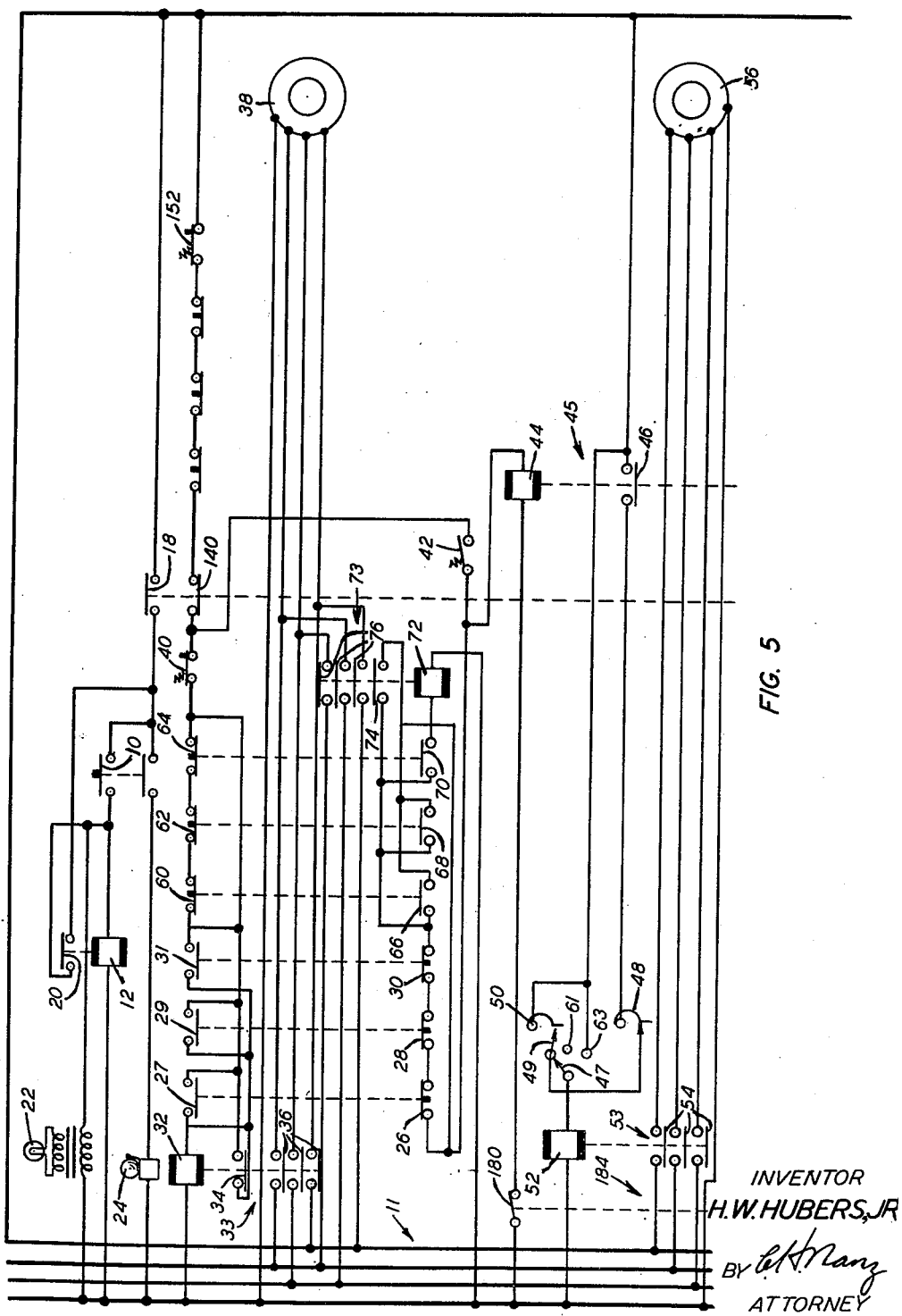
Fig. 5 is a diagrammatic view of a portion of a control system forming part of the apparatus.
Figure 6:
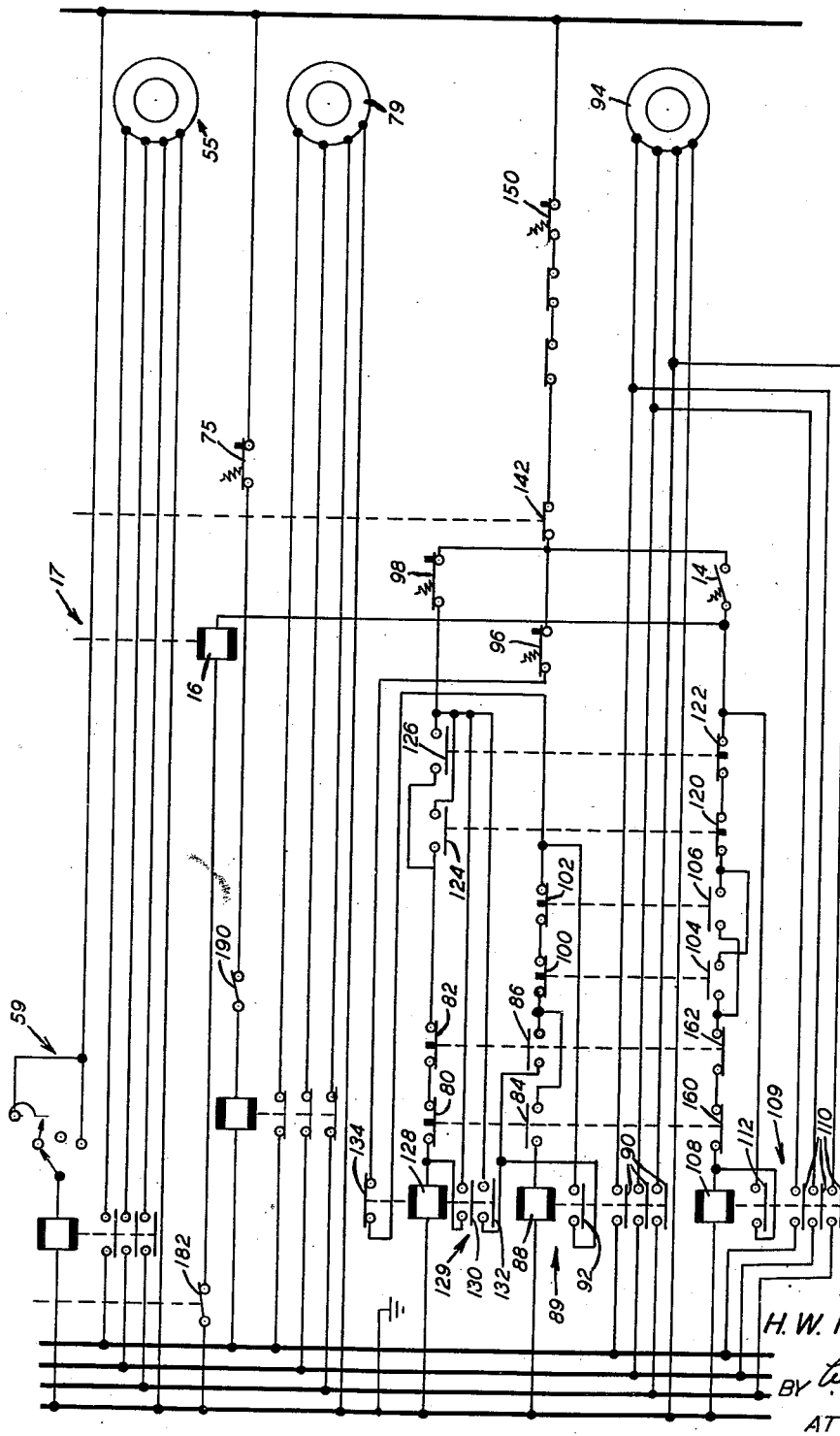
Fig. 6 is a diagrammatic view of the remainder of the control circuit.

After the exterior door 7 is opened, a truck may be driven up to the interior door 8 and one of manually operable contacts 60, 62 and 64, located outside the exterior door 7, inside the auto court and inside the building, respectively, may be actuated manually to close a corresponding one of contacts 66, 68 and 70 (Fig. 5) interlocked therewith. This energizes a relay winding 72 of a relay 73 to close holding contacts 74 and motor controlling contacts 76—76 to drive the motor 38 in a door closing direction. When the exterior door gets to closed position, the limit switch 40 is closed and the limit switch 42 is opened to stop the motor 38 and to break the circuit to the relay winding 44. A limit switch 75 (Fig. 4) openable by a lug 77 driven by a screw 78 is closed whenever the door 7 is not fully open to cause energization of an exhaust fan motor 79 (Fig. 6). Deenergization of the winding 44 (Fig. 5) opens contacts 46 to stop energization of the motor 56 by the outside thermostat 48.

After the exterior door 7 (Fig. 1) is closed, the interior door 8 may be opened. If it is desired to open the interior door 8 to its fullest extent, one of manually operable contacts 80 and 82 (Figs. 1 and 6) is opened, whereby a corresponding one of contacts 84 and 86 interlocked therewith is closed. This closes a circuit through the closed one of the contacts 84 and 86 through a relay winding 88 of a relay 89 to close relay contacts 90—90 to cause energization of an interior door motor 94 to drive a shaft 93 in a direction opening the interior door. The interior door is moved upwardly, permitting the limit switch 14 to close, until it has been raised to its wide open position at which time a limit switch 96 is opened by a lug 95 to stop the motor 94. As the interior door was raised to a predetermined partially open position, a limit switch 98 was opened by a lug 97 without affecting the motor circuit. The lugs 95 and 97 are movable by the screw 99 and the screw 13, respectively, in synchronization with the movement of the interior door.

To close the interior door 8, one of manually operable switch contacts 100 and 102 (Figs. 1 and 6) located in the auto court and in the building, respectively, is opened, thereby closing the corresponding one of contacts 104 and 106. Closing the one of the contacts 104 and 106 closes a circuit through a relay winding 108 of a relay 109, the limit switch 14 having been closed by opening the interior door. The relay winding 108 then closes motor contacts 110—110 and holding contacts 112 to reverse the motor 94 to close the interior door. As the door is moved closed, the limit switches 96 and 98 are closed successively by movement of the lugs 95 and 97 and the limit switch 14 is opened at the end of the closing movement, thereby deenergizing the motor 94.

To open the interior door to its partially open position only so that time may be saved in the opening of that door in instances when the door 8 need not be fully opened for loading and unloading operations, one of manually operable, momentary switch contacts 120 and 122 is opened, thereby closing the corresponding one of contacts 124 and 126 interlocked with the contacts 120 and 122, respectively, which closes the circuit to a relay winding 128 of a relay 129. This closes holding contacts 130 and contacts 132, and opens contacts 134 to prevent operation of the circuit for opening the door completely. Closing of contacts 130 keeps the relay winding 128 energized, and closing of contacts 132 causes energization of the relay winding 88 to run the motor 94 in a door-opening direction. As the interior door reaches its partially open position, the limit switch 98 (Figs. 3 and 6) is opened by the lug 97 to stop the door at that position.

The interior door may be closed from its partially open position by actuating one of the switch contacts 100 and 102. Closing of the interior door causes the lug 15 to open the limit switch 14, which deenergizes the relay 16 so that contacts 140 reclose to permit the exterior door to be opened. Similarly, when the exterior door 7 is open the limit switch 42 is closed so that the relay winding 44 is energized, thereby opening contacts 142 and preventing operation of the interior door 8.

Limit switches 150 (Fig. 6) and 152 (Fig. 5) are openable by manually operative hoists opening and closing the interior door 8 and the exterior door 7, respectively, to stop push button operation of that door being operated by the manually operative hoist therefor. Switch contacts 160 and 162 interlocked with the switch contacts 80 and 82, respectively, protect the windings 88 and 108, which are mechanically interlocked, from strain if both one of the contacts 80 and 82 and one of the contacts 100 and 102 are actuated simultaneously by accident.

Certain features of the interlocking door-control system described hereinabove are disclosed and claimed in patent No. 2,559,301, granted July 3, 1951.

Whenever the exterior door 7 is moved away from its fully closed position, the switch contacts 42 are closed to energize the winding 44 to close switch contacts 46 in series with the outside thermostatic switch 48. If the temperature outside the door 7 is below the predetermined minimum temperature at which the switch 48 opens, the switch 48 is closed and causing the relay winding 52 to be energized to close contacts 54—54 to the heater fan motor 56. The motor 56 drives the fan 57 of the heater near the door to blow a curtain of warm air across the door opening thereby preventing undue cooling of the motor court. This occurs whenever the door 7 is open and the outside temperature is below the predetermined value regardless of the inside temperature in the court. If the outside temperature is above said value, above which the court would not be unduly cooled when the exterior door is open, the switch 48 is open and only the indoor thermostatic switch 50 controls the operation of the fan motor. Whenever the exterior door is in its closed position, the relay contacts 46 in series with the switch 48 are open so that the outside temperature then has no effect on the operation of the fan motor 56 (Fig. 5).

Contacts 180 and 182 (Figs. 5 and 6) of a key-operable switch 184 are provided in series with relay windings 44 and 16, respectively. In periods of cold weather the contacts 180 and 182 are closed so that the relays 17 and 45 are operative to interconnect the circuits controlling the opening and closing of the doors. In summer, when no heating of the auto court is needed, the contacts 180 and 182 are opened so that each door may be operated independently of the other and the circuit to the thermostatic switches 48 and 50 is broken. A key switch 199 may be opened in summer to prevent operation of the exhaust fan motor 79 since the exterior door is kept open during warm weather and exhaust fumes from trucks need not be drawn artificially from the auto court.

*Operation*

Whenever the exterior door 7 is moved away from its fully closed position, the switch 42 is closed to energize the winding 44 to close the switch contacts 46 in series with the outside thermostatic switch 48. If the temperature outside the door 7 is below the predetermined minimum temperature at which the switch 48 opens, the switch 48 is closed causing the relay winding 52 to be energized to close contacts 54—54 to the heater fan motor 56. The motor 56 drives the fan 57 of the heater near the door to blow a curtain of warm air across the door opening thereby preventing undue cooling of the motor court. This occurs whenever the door 7 is open and the outside temperature is below the predetermined value regardless of the inside temperature in the court. If the outside temperature is above said value, above which the court would not be unduly cooled when the exterior door is open, the switch 48 is open and only the indoor thermostatic switch 50 controls the operation of the fan motor. Whenever the exterior door is in its closed position, the relay contacts 46 in series with the switch 48 are open so that the outside temperature then has no effect on the operation of the fan motor.

The unit heater 55 is actuated whenever the temperature in the auto court is below a predetermined value, for example 70° F., by closing of the thermostatic switch 59. The system including the heaters 55 and 58 keep the auto court interior at a comfortable temperature at all times in cold weather, whether or not the exterior door 7 is closed.

The method and apparatus described hereinabove provide a curtain of warm air across the exterior doorway whenever the exterior door 7 is open and the outside temperature is too cold. Thus, the effect of the outside temperature on the interior temperature is kept to a minimum even though the exterior temperature is very low and the exterior door is open for considerable periods of time. Maintaining the auto court at a comfortable temperature also keeps the area in the building beyond the auto court at a comfortable temperature.

What is claimed is:

1. An apparatus for controlling temperatures of rooms, which comprises a room having a doorway, a door movable between open and closed positions, a heater for heating air, a fan for blowing air through the heater transversely across the doorway, an electric motor for driving the fan, a power line, a relay having a winding and contacts in series with the motor and the power line, a thermostatic switch positioned inside the room in series with the relay winding and closable when the temperature in the room is below a predetermined point for energizing the motor, a second thermostatic switch positioned outside the room in series with the relay winding and in parallel with the first-mentioned switch, said second-mentioned switch being closable when the outside temperature is below a predetermined value, a third switch closable by the door as the door is opened in series with the relay winding and the second-mentioned thermostatic switch, and a manually operable switch having a contact in series with the thermostatic switches, a contact in parallel with the thermostatic switches and the third-mentioned switch and a contactor movable into selective engagement with the contacts and in series with the relay winding.

2. The method of controlling the temperature of a room having an opening therein and means for closing the opening, which comprises maintaining the room at a predetermined temperature, blowing a current of heated air downwardly across the opening when the temperature of the room near the opening is below a predetermined value, and blowing a current of heated air downwardly across the opening even though the temperature of the room is above said predetermined value when the opening is open and the temperature outside the room is below a predetermined value to prevent low temperature outside air from entering and cooling the room.

3. An apparatus for controlling the temperature of a room having a doorway, which comprises a door movable between opened and closed positions with respect to said doorway, means for heating the portion of the room adjacent to the doorway, means responsive to the temperature of the portion of the room adjacent to the doorway for controlling the heating means to maintain a predetermined temperature in said portion of the room, and means responsive to the position of the door and the temperature outside the doorway for rendering the heating means operative when the door is in an open position and the temperature outside the door is below a predetermined value.

4. An apparatus for controlling the temperature of a room having a doorway, which comprises a door movable between opened and closed positions with respect to said doorway, electrically operable means for blowing a current of heated air across the doorway, a thermostatic switch positioned outside the room and closable when the temperature outside the room is below a predetermined value, and means operable by movement of the door for rendering the heating means operative to blow a current of heated air across the doorway when the door is opened and the thermostatic switch is closed.

5. An apparatus for controlling the temperature of a room having a doorway opening into the atmosphere, which comprises a door movable between opened and closed positions with respect to said doorway, electrically operable means for belowing a current of heated air across the doorway, a thermostatic switch positioned in the portion of the room adjacent to the doorway and closable when the temperature in said portion of the room is below a predetermined value to cause the blowing means to operate and maintain a predetermined temperature in said portion of the room, a thermostatic switch positioned outside the room and closable when the temperature outside the room is below a predetermined value, and means operable by movement of the door to render the blowing means operative to blow a current of heated air across the doorway when the door is opened and the outside thermostatic switch is closed.

6. An apparatus for controlling the temperature of a room having a door opening into the atmosphere and a door opening into a heated area, which comprises means for heating the room, means responsive to the temperature of the room for controlling the heating means so as to maintain the room at a predetermined temperature, a second heating means for blowing a current of heated air across the exterior door, means responsive to the temperature of the portion of the room adjacent to the exterior door for controlling the operation of the second heating means, a thermostatic switch positioned outside the exterior door and closable when the temperature outside the exterior door is below a predetermined value, means for opening and closing the exterior door, and means operable by movement of the exterior door for rendering the second heating means operative to blow a current of heated air across the exterior doorway when the door is open and the outside thermostatic switch is closed.

HERMAN W. HUBERS, JR.

REFERENCES CITED

The following references are of record in the file of this patent:

UNITED STATES PATENTS

| Number | Name | Date |
| --- | --- | --- |
| 1,173,555 | Caldwell | Feb. 29, 1916 |
| 1,832,508 | Scott | Nov. 17, 1931 |
| 1,872,175 | Peele | Aug. 16, 1932 |
| 2,366,003 | Crago | Dec. 26, 1944 |